(12) United States Patent
Rastegar et al.

(10) Patent No.: US 12,377,553 B2
(45) Date of Patent: Aug. 5, 2025

(54) SYSTEM AND METHODS FOR PROVIDING BATTERY CHARGING SERVICE TO PARKED ELECTRIC VEHICLES

(71) Applicant: Omnitek Partners LLC, Ronkonkoma, NY (US)

(72) Inventors: Jahangir S Rastegar, Stony Brook, NY (US); Thomas Spinelli, Northport, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 569 days.

(21) Appl. No.: 17/397,861

(22) Filed: Aug. 9, 2021

(65) Prior Publication Data

US 2022/0048195 A1    Feb. 17, 2022

Related U.S. Application Data

(60) Provisional application No. 63/065,457, filed on Aug. 13, 2020.

(51) Int. Cl.
| | | |
|---|---|---|
| *B25J 11/00* | (2006.01) | |
| *B25J 9/00* | (2006.01) | |
| *B60L 53/18* | (2019.01) | |
| *B60L 53/35* | (2019.01) | |

(52) U.S. Cl.
CPC .......... *B25J 11/008* (2013.01); *B25J 9/0084* (2013.01); *B60L 53/18* (2019.02); *B60L 53/35* (2019.02); *B60L 2200/36* (2013.01)

(58) Field of Classification Search
USPC ......................................................... 320/104
See application file for complete search history.

(56) References Cited

U.S. PATENT DOCUMENTS

| 11,541,769 B2* | 1/2023 | Kwak | G05B 19/042 |
| 2019/0135125 A1* | 5/2019 | Sponheimer | B60L 53/12 |
| 2020/0031248 A1* | 1/2020 | Kwak | G05D 1/0231 |

* cited by examiner

*Primary Examiner* — Mohammed Alam

(57) ABSTRACT

A service vehicle for charging a parked electric vehicle, the service vehicle including: one or more charging robots disposed on the service vehicle, the one or more charging robots being configured to supply electrical energy to the parked electric vehicle to charge one or more batteries of the electric vehicle. Where the one or more charging robots are configured to have a first shape for storage on the service vehicle and to have a second shape when deployed from the service vehicle, the second shape being configured to charge the one or more batteries of the electric vehicle; and the second shape being different from the first shape. The charging robot including a source of electrical energy; and a charging cable for electrically connecting the source of electrical energy to the one or more batteries of the electric vehicle.

9 Claims, 9 Drawing Sheets

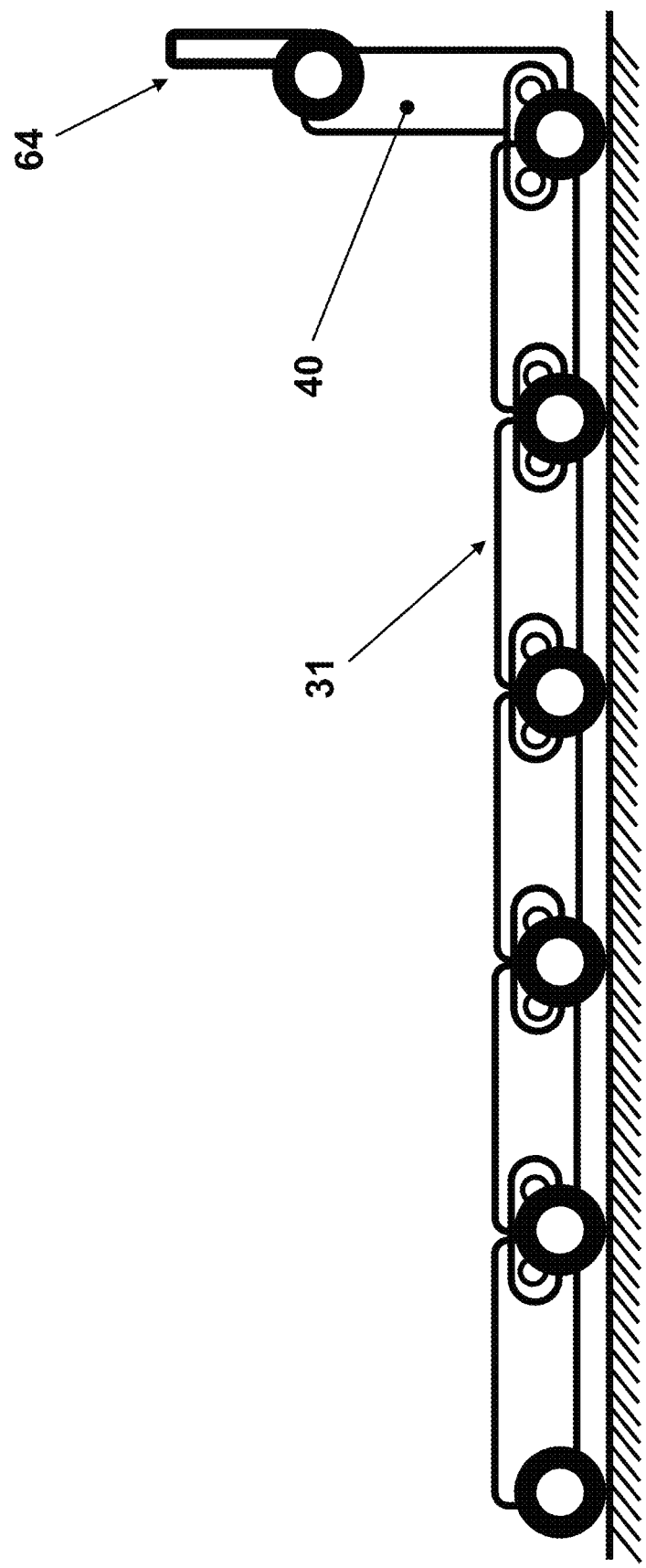

SYSTEM AND METHODS FOR PROVIDING BATTERY CHARGING SERVICE TO PARKED ELECTRIC VEHICLES

CROSS-REFERENCE TO RELATED APPLICATION

This application claims the benefit of U.S. Provisional Application No. 63/065,457, filed on Aug. 13, 2020, the entire contents of which is incorporated herein by reference.

BACKGROUND

1. Field

The present disclosure relates generally to autonomous systems and methods that provide a service of charging parked electric vehicles upon a transmitted request and methods of performing transaction with the customer, and more particularly a system that can be used by an electric vehicle customer to order on-line to charge the batteries of the vehicle that is parked at a certain location a certain amount of electrical energy and performing the required transaction.

2. Prior Art

The number of electric vehicles is rapidly increasing. The batteries used in all electric cars require relatively a long time to charge without any damage and reduction in service life. Current and foreseeable future electric vehicle batteries may take well over 30 minutes to charge to drive around 100 miles even with fast charging facilities. For this reason, charging stations have been installed in many parking lots so that the person parking the electric car could also charge the vehicle battery while away attending to whatever business that has brought the driver to park the electric vehicle (hereinafter referred to as "EVs") in the parking lot. In addition, hereinafter the term "EV"s is intended not to be limited to regular passenger cars but refer to all types of vehicles, including passenger cars, various trucks, station wagons, vans and mini-vans, motor cycles, tri-cycles, etc., all which are fully or partially electrically powered by electrical energy storage devices, such as rechargeable batteries or capacitors/super-capacitors or their combination.

An EV is a vehicle that uses rechargeable batteries and an electric motor, which is driven by the electric motor using energy stored in the batteries and charges the batteries using external power sources. Thus, like vehicles powered by internal combustion engines that require to refuel as the stored fuel is consumed by the engine, the batteries of EVs need to be recharged frequently as the level of stored electrical energy in the batteries drops as the vehicle is used. Therefore, charging stations must be provided for charging the EV batteries.

Many EV users charge their vehicle batteries at home using different available chargers than are powered by line power. However, those living in apartments without assigned and provided charging facility and in general, when not at home, for example at work or parked in a shopping mall or airport or other large parking areas or on travel, the EV has to be frequently charged.

The current options for charging EV batteries is to drive to charging stations, which may be a charging station similar to a gasoline station, or park at a few locations that are provided with charging facilities in parking garages; malls, hotel, restaurant, work, airport, etc., parking lots. In addition, charging robots have also been proposed for use in parking lots or buildings that would be guided to a designated parked EV to charge its batteries as requested by the user.

It is impractical to provide access to charging units at every possible parking spot in a large parking lot. Such facilities will be very expensive to build and to maintain and also going to be used only a very small fraction of the time. Putting such facilities along all roads where cars park so that they may once in a while use it is also impractical and economically unjustifiable.

Current the gasoline station model for internal combustion engines is practical since it only takes a few minutes to fill a gasoline or diesel tank and then drive several hundred miles before the need for refueling. However, all current rechargeable batteries that are used in electric vehicles and those expected to become available in the foreseeable future take a considerable amount of time, currently more than one hour with the fastest charging capabilities, to charge. Therefore, the current gasoline station model is not practical and also not economical since it can only provide charging service to a very few EVs during a working shift since each EV would take 1-2 hours to charge at minimum.

It is appreciated by those skilled in the art that mobile robots for charging electrical vehicles has been developed. One such self-driving autonomous mobile charging robot has been developed by the Volkswagen Company that can charge electric vehicles in a parking garage using mobile battery packs. The mobile robot can carry several battery packs for charging the intended electric vehicle.

However, a manned or unmanned system for delivering charging robots to requested destinations that can handle various surrounding conditions of the electric vehicle that has requested charging service and methods of providing such a service has not been previously known.

SUMMARY OF THE INVENTION

There is therefore a need for methods to structure a system for charging electric vehicles of various types irrespective of where they are parked. In such a system, the user contacts a central location (or a local provided location) of an enterprise that is providing the service (hereinafter referred to as the "Charging Enterprise") via a mobile telephone app or online computer or any other means of communications that may be provided, indicate which EV to be charged, provides the EV location, the amount of electrical energy that the EV batteries have to be charged, the time and date that the EV is available for charging and the duration of time that the EV is available for charging. The "Charging Enterprise" will then send a human operated or robotic vehicle to the location and charge the EV batteries to the requested level. The user account (or credit card or bank card or the like) is then charged or the user is sent a bill or an amount is debited from their account. The user's EZ-Pass or Sun-Pass can also be used to charge the user for the charging service where the charging robot includes a transponder for communicating with the EZ-Pass or Sun-Pass or the like.

There is also a need for methods and apparatus for delivering requested charging service to parked electric vehicles, such as manned or unmanned charging vehicles (hereinafter referred to as "Service Vehicle" or in short (SV)), that provides the service and does not have to stay around until the vehicle is charged in order to make the process of charging electrical vehicles as described above economically feasible.

There is a need for methods to provide the exact location of the parked EV to be charged to the SV and provide the means of rapidly identifying the parked EV by the SV, both manned and unmanned, are provided.

There is also a need for methods and apparatus for delivering requested charging services to parked electric vehicles such that the manned or unmanned charging vehicle that is providing service does not block the passing traffic during the entire long period of charging the electric vehicle.

There is also a need for charging robots with appropriately designed structures, versatility, mobility, dexterity and geometrical characteristics that would allow them to engage an electric vehicle charging port with minimal interference with other vehicle traffic or parking spaces, foot traffic, and the like, and without creating any hazardous conditions.

There is also a need for charging robots that are readily deployed for charging electric vehicles by manned of unmanned SV and engaged and disengaged from the EV charging connection port. The charging robot is also desired to be quickly retrieved by the manned or unmanned SV.

Accordingly, methods are provided to structure a system, i.e., a "Charging Enterprise" (CE), for charging electric vehicles of various type irrespective of where they are parked. With such an CE, the user contacts a central location (or a local provided location) via a mobile telephone app or online computer or any other means of communications that may be provided, indicate which EV is to be charged, provides the EV location, the amount of electrical energy that the EV batteries have to be charged, the time and date that the EV is available for charging and the duration of time that the EV is available for charging. The "Charging Enterprise" will then send a human operated or robotic vehicle to the location and charge the EV batteries to the requested level. The user account (or credit card or bank card or the like) is then charged or the user is sent a bill.

Furthermore, methods and apparatus are also provided for delivering requested charging service to parked electric vehicles, such as manned or unmanned service vehicles that can provide the services without spending extensive time on each EV charging service.

Furthermore, methods that can be used to indicate the exact location of the parked EV to be charged to the SV and the means for rapid identification of the parked EV by the SV, both manned and unmanned, are provided.

Furthermore, methods and apparatus for delivering requested charging services to parked electric vehicles via manned or unmanned charging service vehicle (SV) are provided. The provided methods and apparatus have the capability to provide the charging service to the requested electric vehicles without blocking the passing traffic during the entire long period of time that is required to charge electric vehicles.

Furthermore, provided are methods to design charging robots and charging robot designs that are constructed with versatility, mobility, dexterity and geometrical characteristics that would allow them to engage an electric vehicle charging port with minimal effort and interference with other vehicle traffic or parking spaces, foot traffic, and the like, and without creating any hazardous conditions around the EV.

Furthermore, methods and apparatus are provided for the design of charging robots and their deployment systems that makes it possible to rapidly deploy the charging robots and begin the EV charging by manned or unmanned SV and disengaged the charging robot from the EV and retrieve it by the SV.

BRIEF DESCRIPTION OF THE DRAWINGS

These and other features, aspects, and advantages of the apparatus of the present invention will become better understood with regards to the following description, appended claims, and accompanying drawings where:

FIG. 6 illustrates the first embodiment of a reconfigurable charging robot of FIG. 4 in one of its possible configurations to minimally extend beyond the footprint of an electric vehicle while charging its batteries.

DETAILED DESCRIPTION OF THE PREFERRED EMBODIMENT

Figure 1:
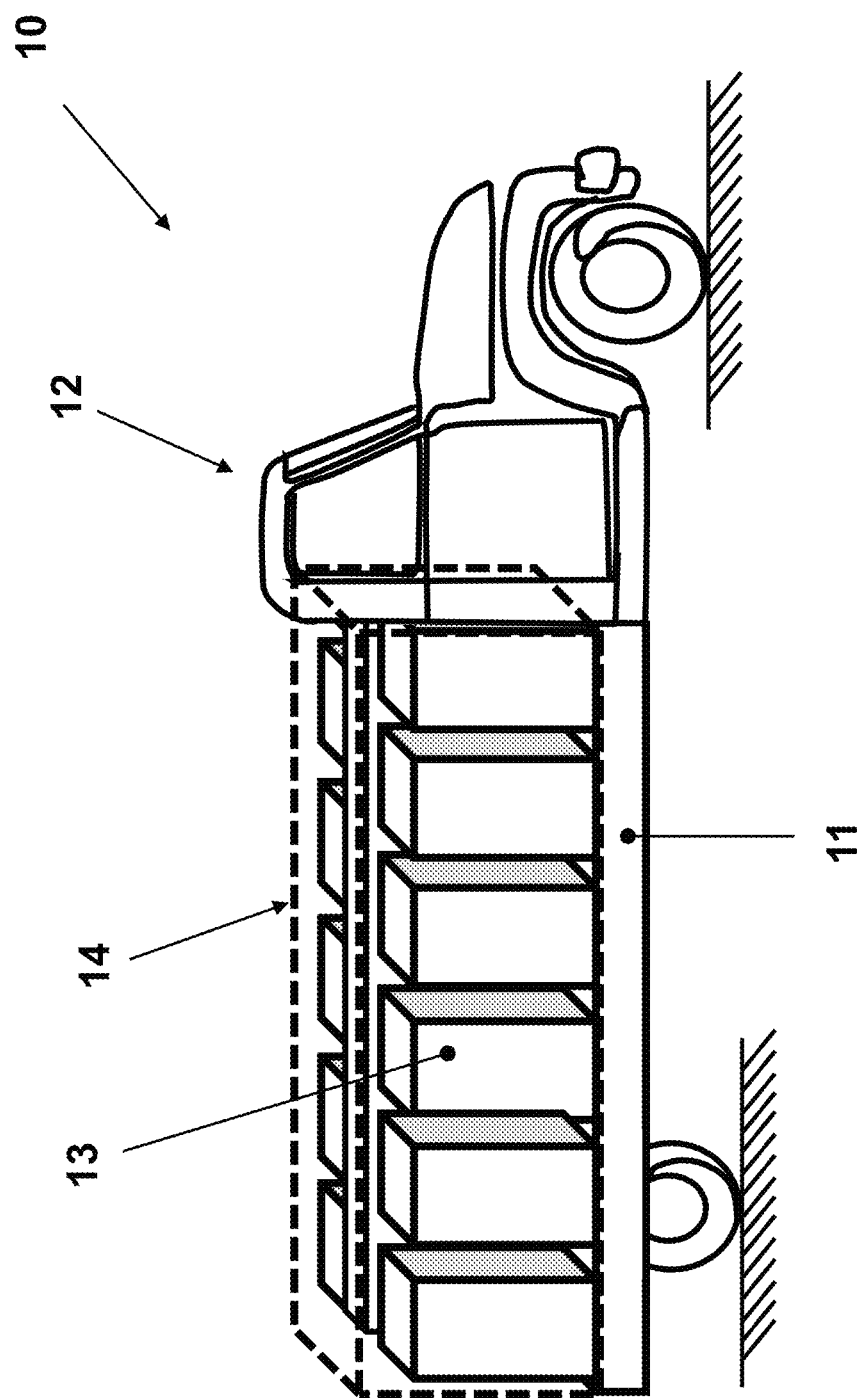
FIG. 1 illustrates the schematic of a manned or unmanned "Service Vehicle" (SV) loaded with several charging robots.

A typical manned or unmanned "Service Vehicle" (SV) that is used to carry Charging Robots (CR) and shown loaded with several CRs is shown in the schematic of FIG. 1. In the schematic of FIG. 1 the SV is shown to be carrying 12 charging robots. However, it is appreciated that, for example, depending on the size and expected number of electric vehicles to be charged and the logistics of the intended location and the area to be serviced and the level of demand at a given day of the week or year and time of the day, a smaller or larger SV with fewer or more charging robots may be provided. For example, when providing charging service to electric vehicles parked in busy city streets, SVs with a narrower profile carrying only one row of CRs may be used. In even more narrow streets and allies, the SV may be an electric cart or motorcycle pulling one or two charging robots on the wheel.

A Service Vehicle (SV) embodiment 10 consists of a platform 11 with an operator (manned version) or driverless control cabin 12 that is otherwise like any other truck or semi-truck type vehicle. The SV embodiment 10 may be powered by an internal combustion engine but can also be powered electrically and operate as an EV. The platform 11 is provided with compartments within which the charging robots (CR) 13 are securely attached and are provided with individual deployment mechanisms as described later in this disclosure. The CR compartments may be provided with individual or collective cover 14 (shown with dashed lines in FIG. 1) for protection from the elements and damage.

Figure 2:
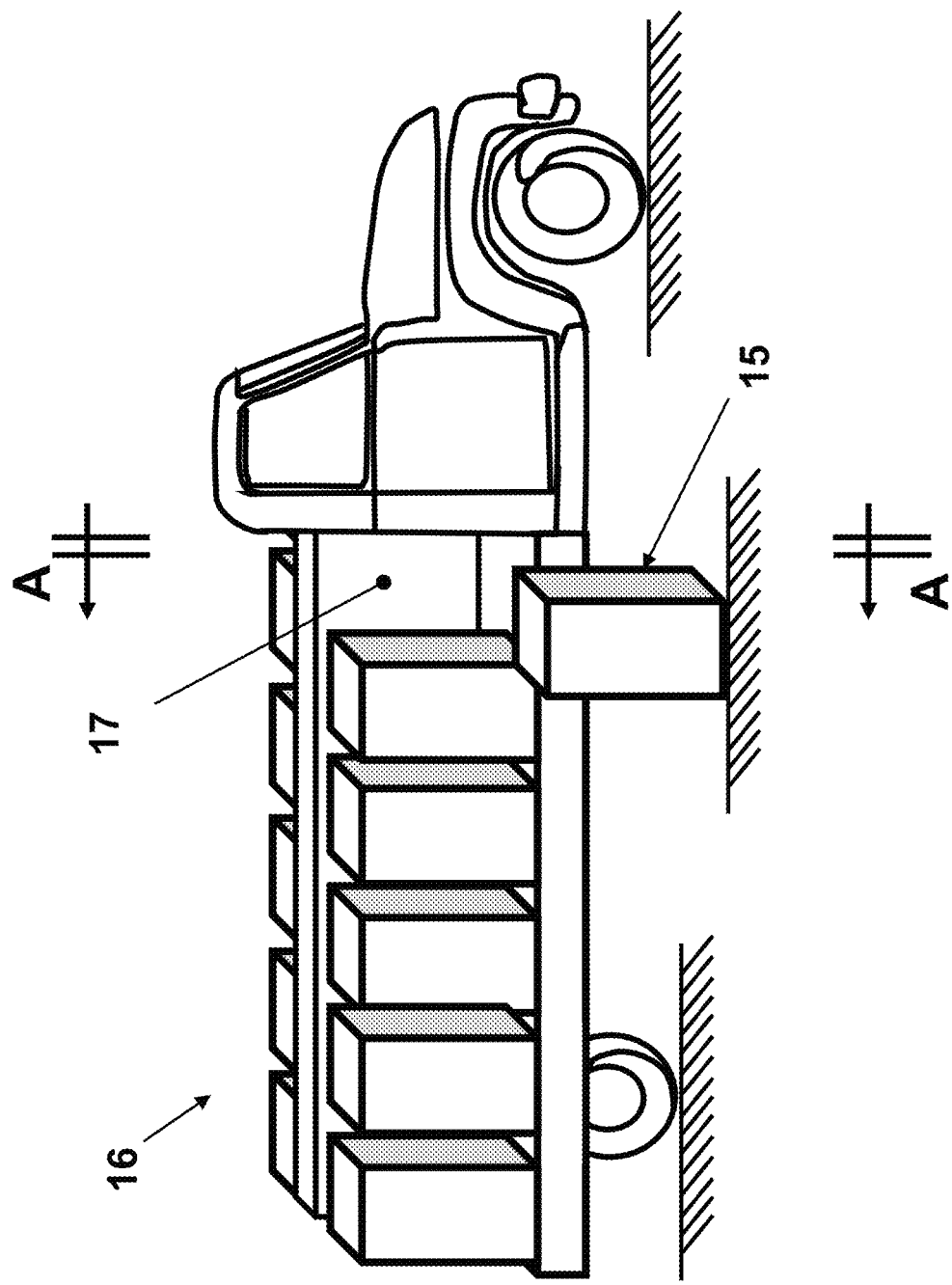
FIG. 2 illustrates a manned or unmanned "Service Vehicle" (SV) unloading a charging robot near an EV to be charged or at the robot charging station.
Figure 3:
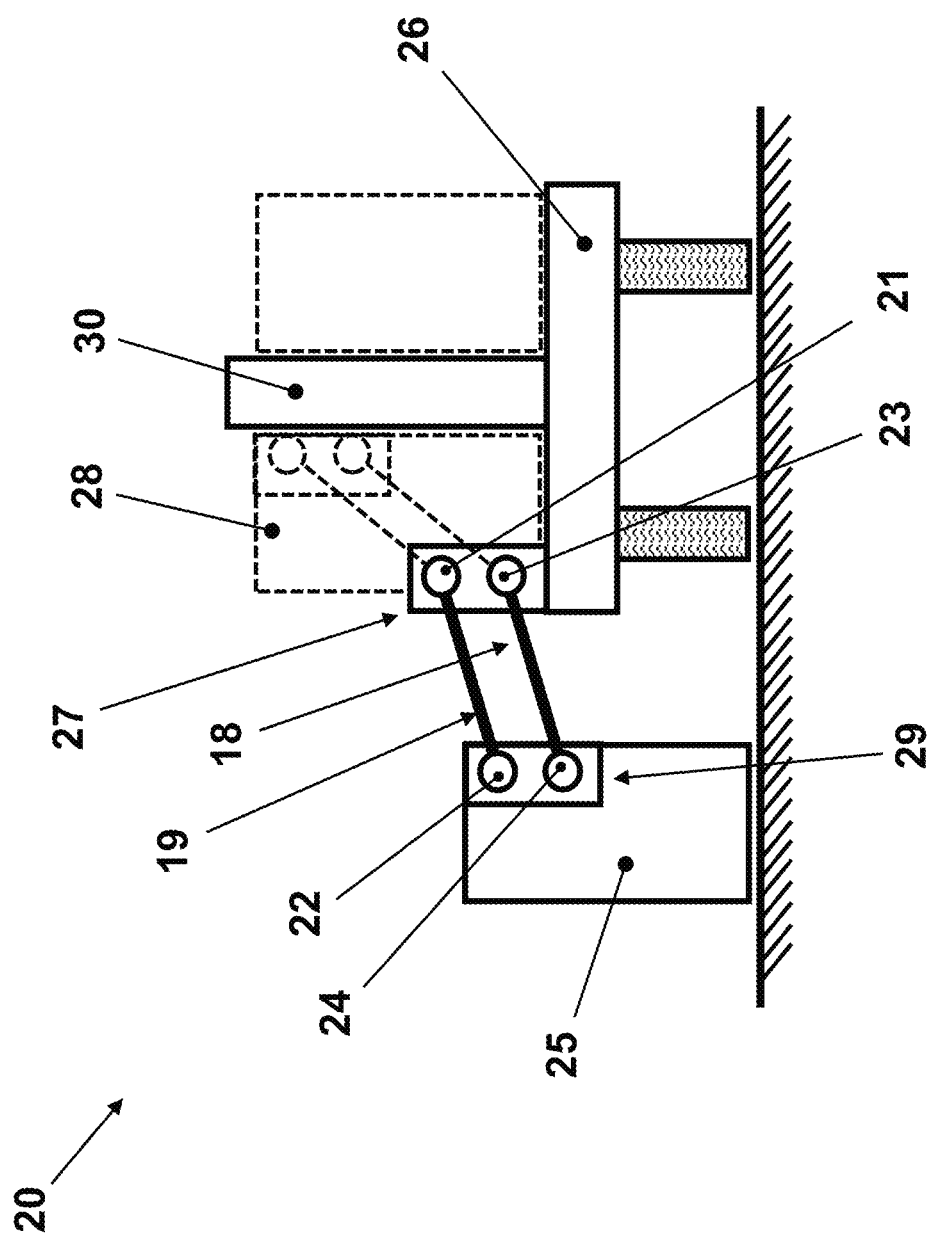
FIG. 3 illustrates a SV mechanism for deploying a charging robot from a SV to provide charging service to a parked EV.

FIG. 2 shows a charging robot 15 that has been downloaded from the compartment 17 of a service vehicle (SV) platform 16 to the ground close to an intended EV to be charged (not shown). FIG. 3 shows a side view as taken along lines A-A in FIG. 2, of a typical mechanism 20 for downloading (deploying) a charging robot (CR) near the EV to be charged. It is appreciated that the mechanism 20 of FIG. 3 is provided only as an example and numerous other mechanisms may also be used for this purpose. It is also appreciated that the mechanism of 20 of FIG. 3 is seen to be attached to the SV platform. A deploying mechanism may however be attached to the CR and powered by the CR itself.

The deployment mechanism 20 of FIG. 3 consists of the bracket 27 that is fixedly attached to the platform 26 (11 in FIG. 1) of the SV. Two relatively rigid parallel links 18 and 19 are then hinged to the bracket 27 by the rotary joints 23 and 21, respectively, and hinged to the bracket 29, which is attached to the charging robot 25, by the rotary joints 24 and 22, respectively. The bracket 29 is configured as described later in this disclosure to be releasable from the charging robot 25. The links 18 and 19 and the charging robot in its SV loading position are shown with dashed lines. One of the links 18 or 19 is powered, either by a linear actuator (not shown) that is attached to the SV platform (for example its dividing structure 30) or a rotary actuator at one of the joints 21 or 23 to rotate the links 18 and 19 in the counterclockwise direction from their dashed line (SV loaded) position to their CR deployed position shown with solid lines. Once the CR is deployed, the bracket 29 is detached from the CR and the links 18 and 19 and the bracket 29 are retracted to their pre-deployment position shown by dashed lines.

The truck type SV shown in the schematic of FIGS. 1-3 are primarily for providing service to a relatively large parking lot, such as a large airport or shopping mall or office complex parking lot or for covering a large section of a city. For smaller parking lots or areas to be covered, a smaller SV that handles a few CRs could be used.

For a relatively small parking lot or an apartment parking lot, the "Charging Enterprise" may provide charging service to the tenants and their guests by at least one "resident" Mobile Charging Robot" (MCR). The MCR is provided with a docking station to recharge its batteries at the parking lot and would automatically move to the EV that a customer has requested to be charged using the app disclosed later in this disclosure. The "Charging Enterprise" may assign a code identifying the parking lot that includes the map of the parking spots for ease of MCR navigation. For larger parking lots, visual markers and the like may also be provided to further simplify the process of MCR navigation to the intended EV.

Current state of the art provides mobile robots for charging electrical vehicles, such as the autonomous mobile robots developed by the Volkswagen Company. The mobile robots have very limited range and can navigate within a relatively small parking garage. The mobile robots can carry several battery packs for charging the intended electric vehicle.

All currently developed, under development and disclosed charging robots would cover a relatively large area around the intended electric vehicle to be charged for a long time, sometimes well over one hour, and thereby interfere with the traffic around the electric vehicle being charged and block traffic for long periods of time in all busy two-lane two-way streets when charging an electric vehicle and in busy parking lots and garages.

The charging robots disclosed herein can be provided with articulated structures that allow them to reconfigure and deploy such that they extend minimally beyond the footprint of an electric vehicle while charging the electric vehicle. The first embodiment 35 of such a reconfigurable and shape conformal charging robot is shown in the schematic of FIG. 4.

Figure 4:
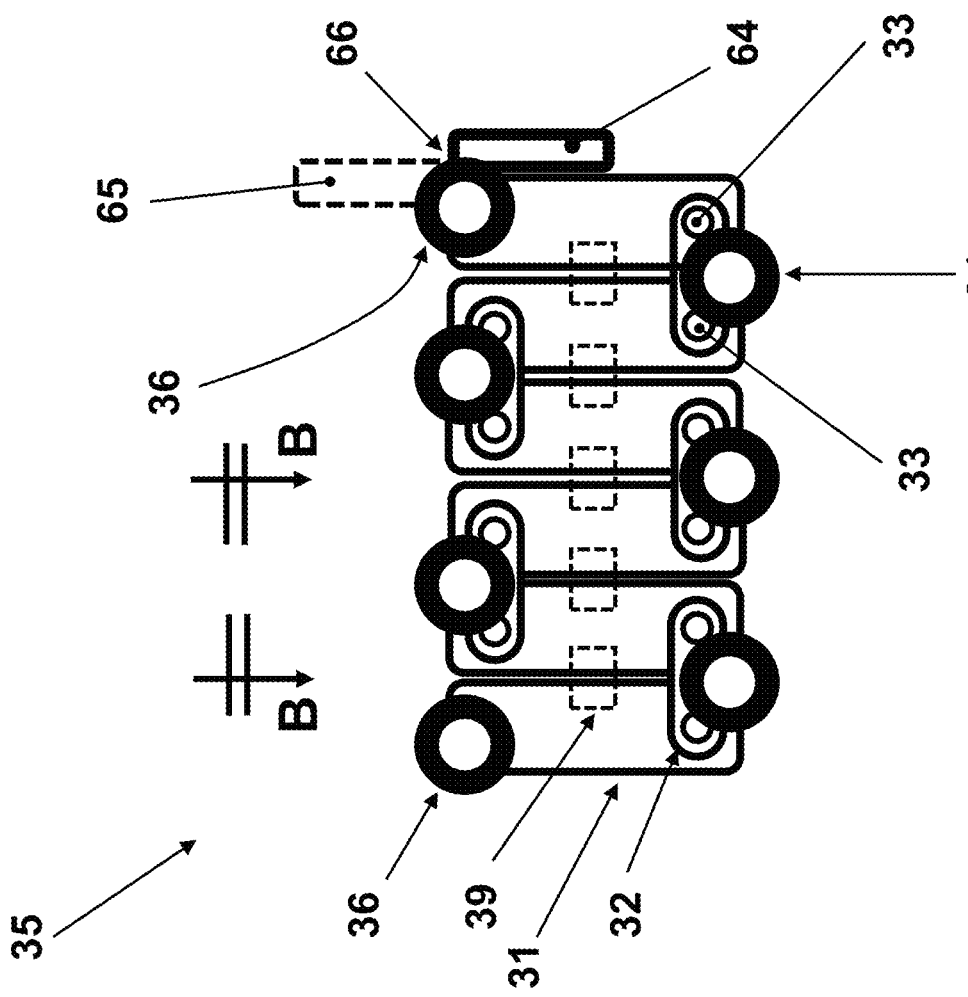
FIG. 4 illustrates the first embodiment of a reconfigurable charging robot that minimally extend beyond the footprint of an electric vehicle while charging the vehicle batteries. The charging robot is shown in its SV transportation and intended location downloading configuration.

FIG. 4 shows the schematic of the first embodiment 35 of the reconfigurable and shape conformal charging robot in its "compact" configuration, which is suitable for SV transportation and downloading close to the EV to be charged. The CR embodiment 35 is modularly constructed with charging battery housings 31 (6 units are shown in FIG. 4), which are connected serially together with brackets 32 that are connected to the housings by rotary joints 33 as shown in FIG. 4. The brackets 32 are provided on both sides of the battery housings 31 as can be seen in the B-B view of FIG. 5. Pairs of wheels 34 are attached to the brackets 32 as shown in FIG. 4 or to the sides of the battery housings 31 and to the free ends of the two end battery housings 31 as indicated by numeral 36. In the schematic of FIG. 4, the wires connecting the batteries in the battery housings together and to the charging inlets for these batteries and the electric vehicle charging cables and controls and switching panels, etc., are not shown for the sake of simplicity and since their possible designs and implementation methods are well known in the art. In addition, the battery housings 31 may be provided with locking mechanisms 39 that would lock the adjacent housing together for stability purposes during transportation and during deployment to charge an electric vehicle as described later in this disclosure. Other features, such as handles (not shown) may also be provided for ease of unit transportation.

Figure 5:
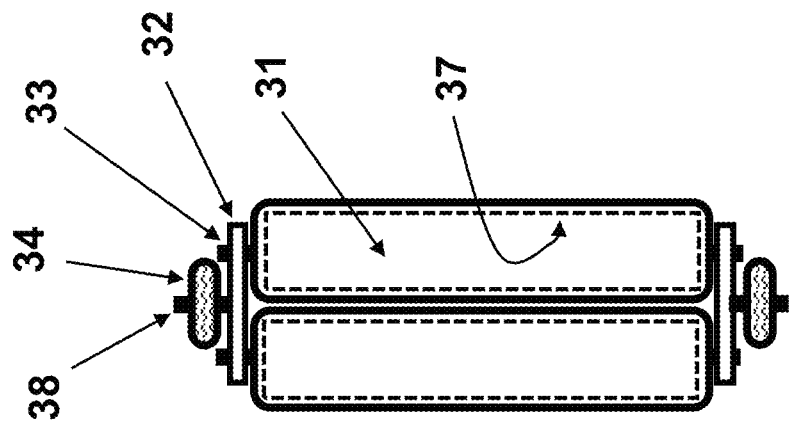
FIG. 5 shows a view of the side of the battery housings of the charging robot of FIG. 4.

As can be seen in the view B-B (FIG. 4) of FIG. 5, pairs of battery housings 31 are joined together at a typical connection by a pair of brackets 32, which are attached to the battery housings 31 by rotary joints 33. A pair of wheels 34 are also attached to the brackets by the joints 38 that allow for free rotation of the wheels relative to the brackets 32.

In FIG. 4, the member 64 is intended to indicate the control panel for the CR 35, which may be attached to the battery housing via a rotary joint 66, which would allow it to be oriented to a desired position, such as the one shown by dashed lines 65. The batteries of the battery housings 31 are connected to each other, to the control panel 64 and the charging cable, which are not shown in FIG. 4 for the sake of clarity.

In the compact configuration of FIG. 4, the wheels 34 and 36 allow for the charging robot to be pushed and pulled with relative ease to its intended location from the SV to the proper positioning relative to the EV to be charged. Once in the desired position relative to the electric vehicle to be charged, one or more of the locking mechanisms 39 are released and the battery housings 31 are rotated relative to each other to position as many of them as necessary to lay on the ground as shown in FIG. 6, in which five of the six battery housings 31 are shown to be laid on the ground and one (left most as viewed in FIG. 6) is vertically oriented relative to the ground.

Figure 7:
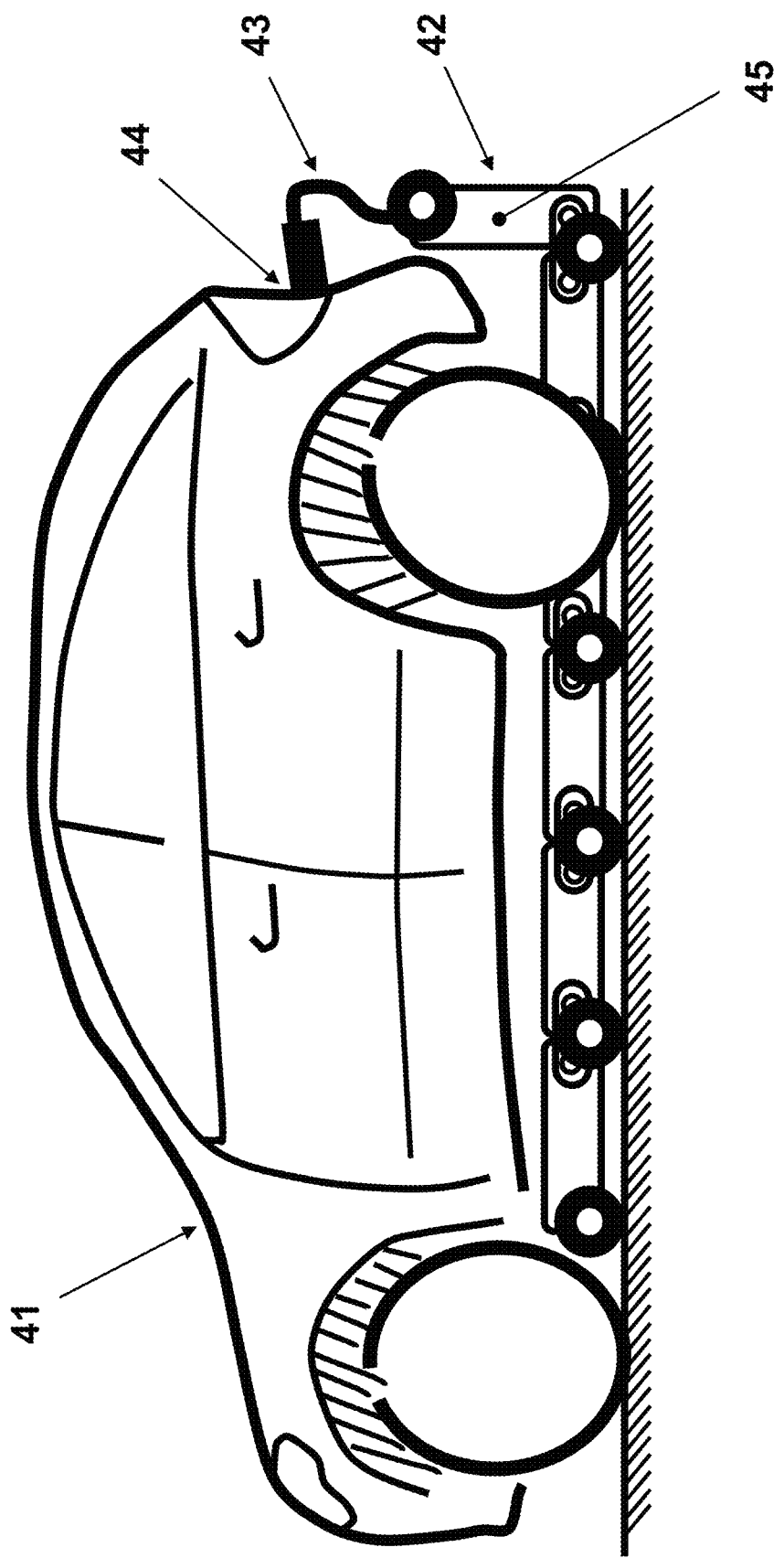
FIG. 7 illustrates one possible deployment of the charging robot of FIG. 4 for charging an electric vehicle with minimal extension beyond the footprint of the vehicle.

FIG. 7 illustrates one possible deployment of the charging robot of FIG. 4 in its configuration of FIG. 6 for charging the electric vehicle 41 with minimal extension beyond the footprint of the vehicle. In FIG. 7, the charging robot 35, FIG. 4, is brought to its configuration of FIG. 6 (indicated by the numeral 42 in FIG. 7) and positioned under the parked electric vehicle 41 and its charging cable 43 plugged into the car charging port 44. As can be seen in FIG. 7, only one of the battery housings 45 is positioned outside the footprint of the electric vehicle. However, it is appreciated that the housing 45 may also be rotated clockwise to lie on the ground and be pushed all the way under the electric vehicle, thereby adding no extension beyond the footprint of the electric vehicle.

In the schematic of FIG. 7, the charging robot is shown to be positioned under the electric vehicle from the rear of the vehicle. It is appreciated that the charging vehicle may be similarly deployed from the front or side of the vehicle or when there is enough space on any side of the vehicle, the charging robot may be used in its compact configuration of FIG. 4 or only some of the battery housings 31 of the charging robot may be unfolded and positioned under the vehicle as it becomes necessary. In this regard, a charging cable 43 may be provided on multiple ends and sides of the charging robot 35 to accommodate different charging port locations.

The CR 35 can also include a locking device for either locking the CR 35 to the EV or rendering the CR immovable to prevent the CR 35 from being stolen or moving relative to the EV so as to prevent the charging cable 43 from coming loose/off. For example, the locking device can comprise locking one or more of the wheels 34, 36 to prevent moving the CR 45.

Figure 9:
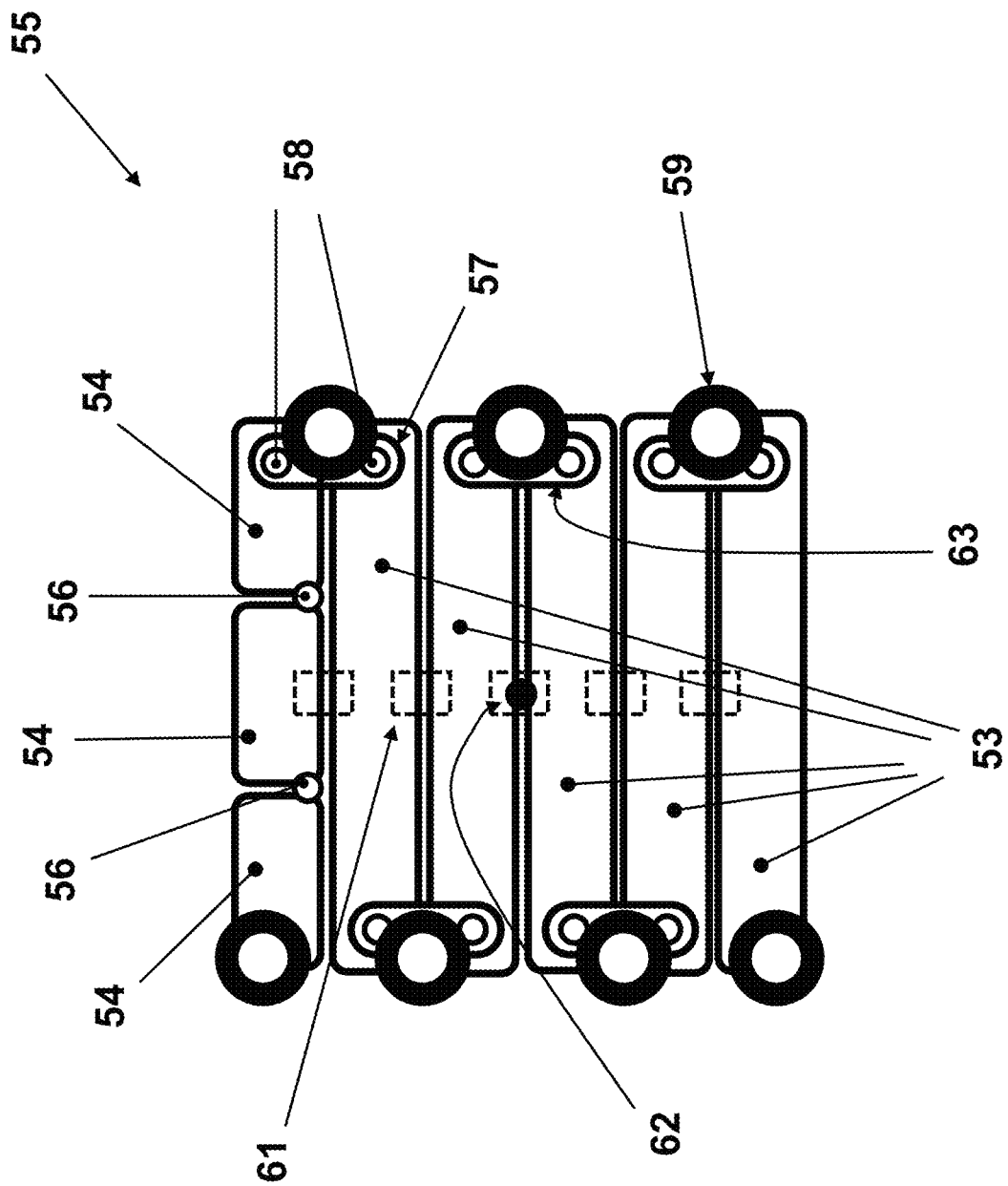
FIG. 9 illustrates an alternative construction of the charging robot of FIG. 4 for the purpose of making it more conformable for deployment to charge an electric vehicle.

It is also appreciated by those skilled in the art that each of the battery housings 31 shown in the schematic of FIG. 4 may be replaced by more than one side by side battery housings that are connected together by rotary joints, for example by one or more sets of three battery housings as shown in the schematic of the charging robot 55 of FIG. 9. As can be seen in FIG. 9, the charging robot 5 comprises five single battery housing 53 levels (similar to battery housings 31 of FIG. 4), and one level consisting of three battery housings 54, which are connected together with rotary joints 56. The battery housings of each level are then attached together by brackets 57 with rotary joints 58 (33 in FIG. 4), as was described for the charging robot 35 of FIG. 4. Wheels 59 (33 in FIG. 4) are also provided for the same purpose that was described for the charging robot 35 of FIG. 4.

It is also appreciated by those skilled in the art that the battery housings of the embodiments 35 and 55 of FIGS. 4 and 9, respectively, may also be connected with other types of connecting joints to allow for other types of relative motions. For example, by eliminating the pair of brackets 63 and their related joints 58 and replacing it with a rotary joint 63 between the two adjacent battery housings, the upper and lower battery housings may be unfolded and extended at a desired angle relative to each other. In addition, various types of linkage mechanisms, for example parallelogram mechanisms, may also be used to connect the battery housings together to allow relative motion between adjacent battery housings to provide for their parallel unfolding It is appreciated that more charging housings 53 may be similarly constructed with more than one individual housing that are connected together with rotary joints. It is appreciated that by providing more than one battery housing in each level, the deployed charging robot (as for example shown in FIG. 6) becomes more conformable and can be folded in several layers, etc., as needed for ease of deploying in available spaces around or under an electric vehicle. In addition, the battery housings 53 and 54 may be provided with locking mechanisms 61 (39 in FIG. 4) that would lock the adjacent battery housings together for stability purposes during transportation and during deployment to charge an electric vehicle.

It is appreciated that the charging robot 35 of FIG. 4 is primarily for manual unloading from the SV and deployment for charging battery, such as shown in FIG. 7. The process of RC deployment under the electric vehicle can be made significantly more effortless by powering at least one of the grounded pairs of the wheels 34. In this modified charging robot 35, electric motor driven drives, such as a commonly used gear motor, may be used to drive the pair of wheels in either direction by controls provided on the CR panel (FIG. 4).

Figure 8:
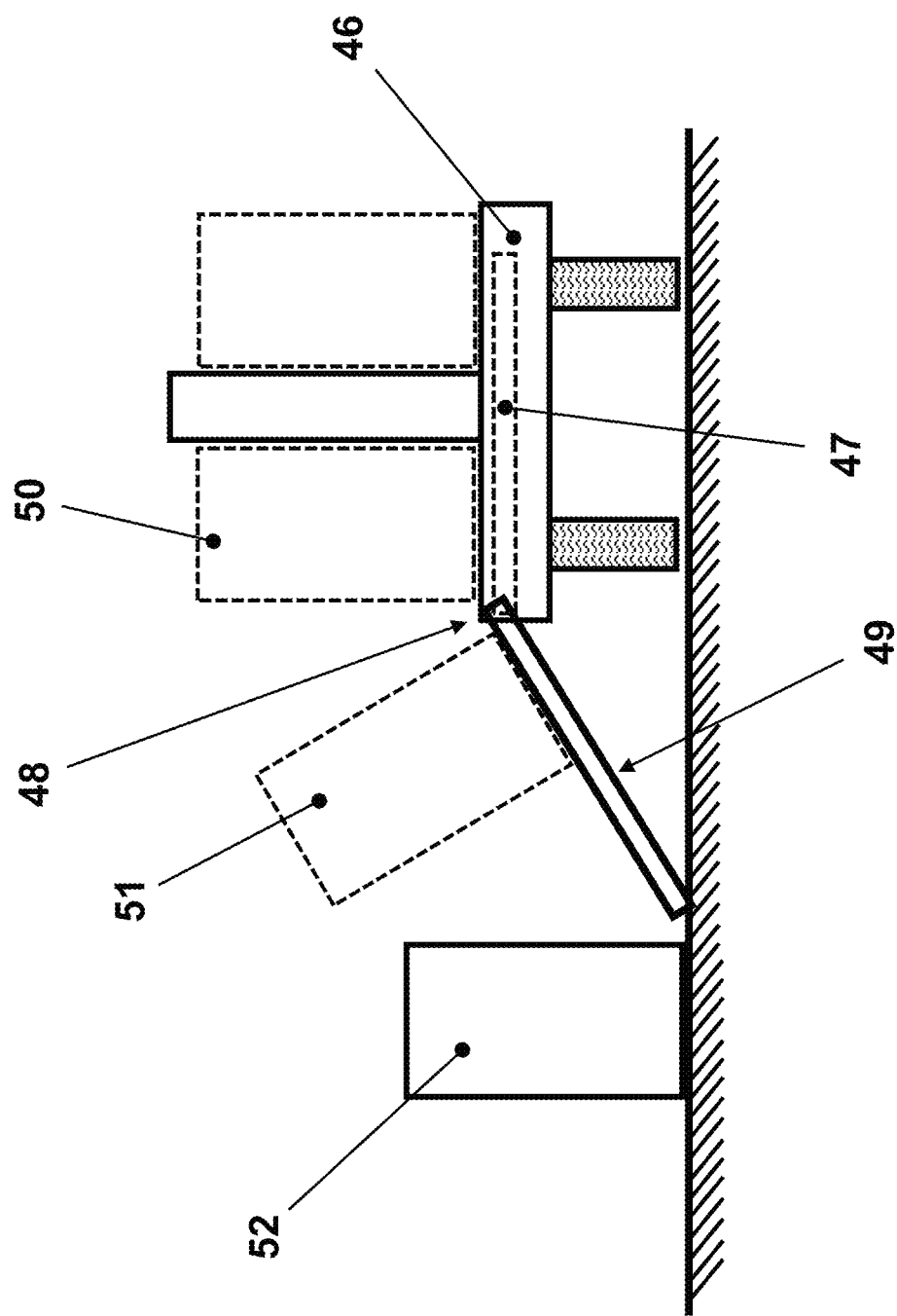
FIG. 8 illustrates an alternative means of downloading charging robots from service vehicles.

In addition, the basic method of unloading the RC from the SV shown in the schematic of FIG. 3 may also be modified to as shown in the schematic of FIG. 8. In this modified unloading mechanism, under the section of the platform 46 (26 in FIG. 3) under the RC stored compartment is provided a pull-out ramp as shown in dashed line in the schematic of FIG. 8. The pull-out ramp can then be pulled out and rotated about its rotary joint 48 and positioned as shown in FIG. 8 and indicated by the numeral 49. The charging robot 50 located in the related compartment can then be unloaded over the ramp (shown with dashed lines and indicated by numeral 51) to its ground level positioning 52. Such pull out ramp may be the width of only one CR and be capable of moving along the length of the SV to another CR to be deployed.

It is appreciated that the modified CR unloading method from SV also has the advantage of making it easier for manned, particularly if at least one pair of the lower wheels (34 in FIG. 4) of the charging robot is powered and can be used to drive the CR without requiring manual force and manipulation. Another advantage of this method of unloading charging robots is that it is suitable for automation when using robotic (unmanned) SV since the deployment of the ramp 49 and unloading and loading of the CR can be readily and safely controlled. In general, the ramp 49 can be provided with some sidewalls for added safety and for providing additional means of guiding the CR down and up the ramp without the possibility of going off the ramp.

The procedure described above for bringing a CR to the EV location by a service vehicle (SV) and its unloading and deployment process was described for almost an entirely manual process performed mostly by an operator. The system is well suited for use in a wide area of operation, for example for use in a large airport parking lot, a large shopping mall or office parking lot, or to provide service to a relatively large section of a city. In particular, where blocking street or parking traffic during CR unloading and deployment is an issue, manual CR unloading and deployment with minimal extension over the electric vehicle footprint is much faster and does not require complex robotic system kinematics, sensory and control algorithms and possibilities of encountering accidents and hazardous conditions are also minimized.

It is appreciated that the CRs onboard a SV may be connected to charging ports provided on the SV so that while the SV is parked in its central station, the CRs can be charged for the next EV charging mission without having to be unloaded from the SV. Power to the SV can then be provided from a connection to the power line and in certain cases from charged batteries provided on the SV. In the latter case, the SV may be provided with a large enough rechargeable battery bank (which may be replaced quickly with fully charged battery bank modules or alternatively, the SV may be provided with a battery bank trailer unit) that eliminates the need to unload the CRs at the SV (Charging Enterprise)

station. The CRs can then be charged even while they are being delivered to the site of the EV requesting charging service.

When the CR is used in a relatively small parking lot or garage, particularly where enough space is provided around the electric vehicle. Then the CR may be operated autonomously and upon request, navigate to the indicated EV and automatically deploy and engage the EV and charge its batteries. Such CR systems are hereinafter referred to as the "Autonomous Charging Robots" (ACR).

Figure 10:
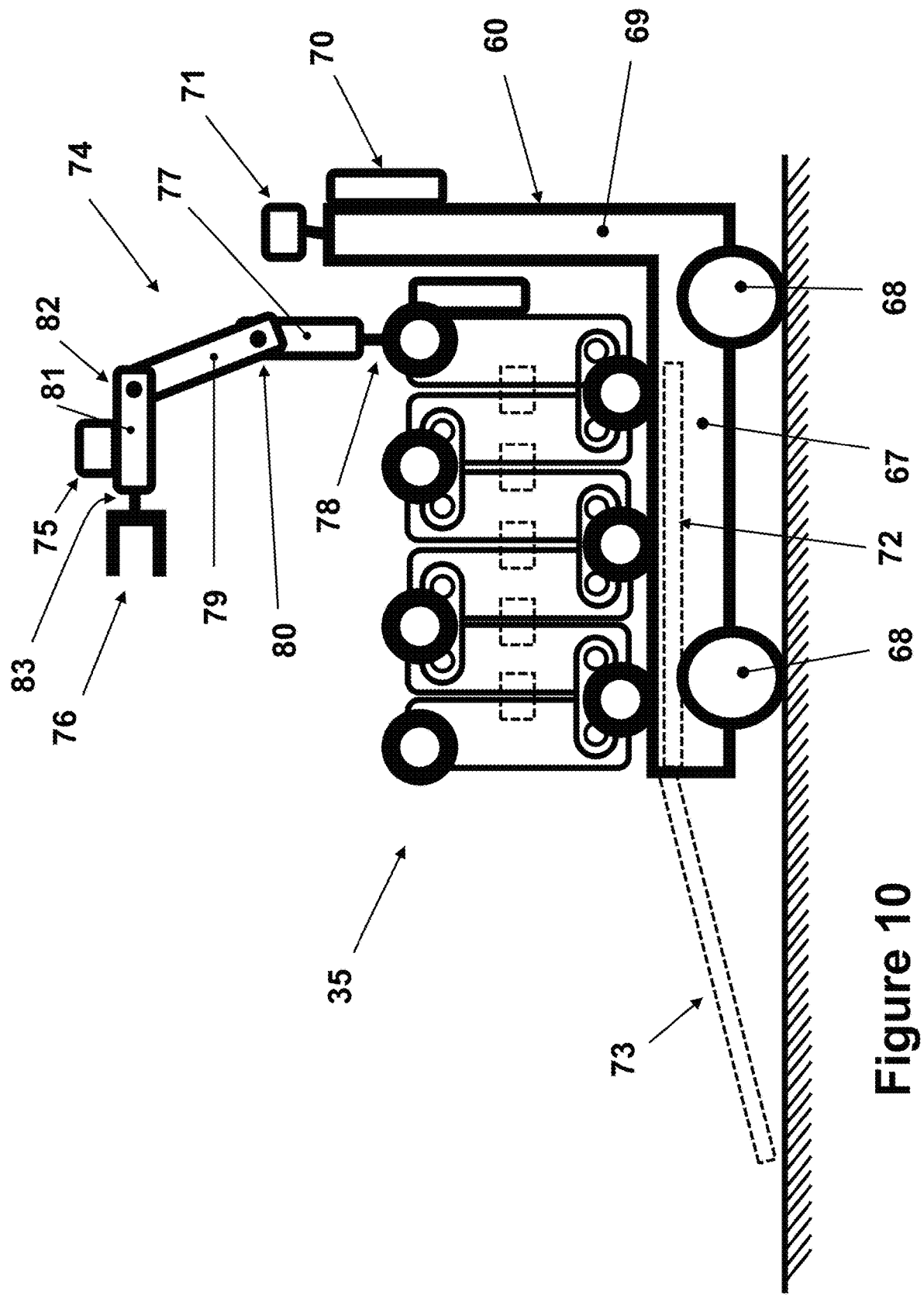
FIG. 10 illustrates one embodiment of the Autonomous Charging Robot (ACR) constructed using the CR embodiment of FIG. 4 or 9.

In one embodiment of an Autonomous Charging Robots (ACR) shown in the schematic of FIG. 10, the ACR consists of a robotic mobile platform 60, which carries the CR embodiment 35 of FIG. 4 (or alternatively the CR embodiment 55 of FIG. 9 or the like) to the EV site and unloads it. The CR would then deploy itself on one of the sides or back or front of the EV depending on space availability and the location of the charging outlet of the EV, and use its at least one robotic arm to engage the charging cable with the EV charging outlet.

The robotic mobile platform 60 is shown to consist of a platform 67, which may be provided with a back structure 69, on which a secure control panel 70 is provided for manual interaction. The robotic mobile platform 60 is provided with wheels 68, pairs of which are provided with additional rotary joints to provide for steering capability as is commonly implemented in similar mobile robotic platforms. The robotic mobile platform 60 is provided with rechargeable battery powered drives and navigation and geo-location sensors and visual based sensor 71 (e.g., LADAR) for safe and precision navigation inside a parking lot or garage. Inside the platform 72 may be provided a deployable ramp 72 (shown with dashed lines) that can be deployed to the position 73 by the robotic mobile platform 60 control system near the EV to be charged. Mobile robots of different type are well known in the art and are used routinely in warehouses and on the factory floors. The mobile robots are also commonly provided with two-way communication systems with a central control system, which may be through internet, to receive commands and navigation information and to perform the required tasks.

The robotic mobile platform 60 may be used by the present "Charging Enterprise" (CE) to serve previously described function of the SV to transport the CR to the EV location inside a relatively small parking lot or garage. In the schematic of FIG. 10 the robotic mobile platform 60 is shown to be loaded with the CR 35 of FIG. 4, which is also equipped with at least one robotic arm 74. The robotic arm 74 is provided to perform the tasks required for deploying the CR 35 at the EV location and connecting and disconnecting the charging cord to the EV charging outlet, for example as shown in FIG. 7. Methods of navigating and identifying and connecting the charging cable to the charging inlet of the EV are known in the art.

The robotic arm 74 has enough degrees of freedom (usually a minimum of three) to reach the EV outlet and to manipulate the charging cord. The robotic arm 74 is preferably provided with a camera 75 that is used to identify the EV and to guide the end-effector 76 in its task of connecting the charging cable to the EV charging outlet and its retraction at the completion of the battery charging process. The robotic arm 74 would also perform tasks such as charging cable manipulation and when necessary the process of deployment of the CR at the EV site, such as releasing the locking mechanisms (not shown) that secures the CR to the robotic mobile platform 60.

The robotic arm 74 of FIG. 10 has five degrees-of-freedom. It consists of the first link 77, which is attached to the CR 35 (FIG. 4) by the two degrees-of-freedom rotary joint 78, which allows the link 77 to rotate about its long axis and about an axis perpendicular to the plane of the FIG. 10 view, thereby allowing the robot arm to rotate about the long axis of the link 77 and extend away from the CR in any direction. The second link 79 is attached to the link 77 by the revolute joint 80 and the third link 81 is attached to the second link to by the revolute joint 82. The end-effector 76 (consisting, for example, a gripper type) is then attached to the third link by the rotary joint 83, which allows it to rotate about the long axis of the link 81.

It is appreciated that at least one set of wheels 34 (FIG. 4) of the CR of FIG. 4 or 9 or the like being used together with the robotic mobile platform 60 must be powered and controlled to drive the CR to the required positioning relative to the EV to be charged, for example, to the positioning shown in FIG. 7 to minimally add to the EV footprint.

It is appreciated by those skilled in the art that the robotic mobile platform 60 and the loaded charging robot (CR) 35 shown in the schematic of FIG. 10 may be integrated as a previously described "Mobile Charging Robot" (MCR). However, it is also appreciated by those skilled in the art that the use of robotic mobile platform 60 to transport CRs to the EV site has the following advantages when the charging service is being provided at certain localities.

Firstly, since each EV may take several hours to fully charge, by providing robotic mobile platforms 60 to deliver CRs to EVs and come back to collect them and bring them back to their docking station for charge filling, one robotic mobile platform can service many electric vehicle charging demands. The total cost of to the "Charging Enterprise" (CE) is thereby reduced.

Secondly, the integrated "Mobile Charging Robot" (MCR) would occupy a significantly larger space on the side of the EV being charged, which would cause traffic blocking and/or parking space occupying issues, particularly in closely spaced parking spaces in most parking garages and small parking lots and may even create hazardous driving conditions in most multi-level parking garages. In addition, since one MCR is to be provided for each needed CR to handle the charging load of a parking lot or parking garage, the total occupied space would also become larger.

The CR can identify the EV that requires charging by any means known in the art, such as by recognizing the license plate or by an identifying indicia disposed on a surface of the EV, such as a bar code or other optically recognizable indicia. For parking lots and garages, visual features and markers can be provided to assist MCR and mobile platforms carrying CR to navigate within the parking lot and garage using vision (camera) and other sensory input such as GPS for larger parking lots and the like, if available.

Access to such charging service can be initiated by the customer opening an account with the "Charging Enterprise" (CE), such as on an app on a mobile device or a website. The customer provides a credit card or other means of payment for the service (e.g., Venmo, EZ or Sun Pass) and the list of EVs and their license plate number as well as other characteristics (model, year, . . . , that would enable the CE to identify and provide the requested service (i.e., charging the batteries, and other possible related services). All EV data about each registered vehicle is stored in the CE database. The database may also store information about EV's, such as battery charging information and charging portion location and configuration for different EV's where such information is recalled for the particular EV that registers for charging and the proper CR or properly configured CR can be used when charging the EV. A processor in the CR controls the CR according to the information entered on the app and/or information stored in memory.

To order charging, the customer uses the App or website to indicate which registered EV is to be charged and the location of the EV. The location of the vehicle may be provided by a GPS locator from the mobile device when ordering at the EV location in which the App can query the user if the location is the same location as the mobile device having the App. The EV location can be provided automatically once the customer provides the EV identification number to the App. The EV location can also be provided by online location data transmission by the user, such as an address can be provided that is then translated to location information. Furthermore, the EV can be provided with location data transmission over Wi-Fi where the EV location is provided automatically once the customer provides the EV identification number. Still further, the EV location can be provided from an address and general parking location provided by the customer. If such case, the EV may be provided with a beacon that the SV can interrogate via an encrypted code as it gets close to the EV and find its location. This feature may be integrated via Wi-Fi connection.

The customer, during the charging service ordering process (using the mobile App or online) can be able to see if the EV is or can be located to ensure that the EV can be located by the CE and charged. The CE will then accept the order if the EV is located or is considered to be locatable. The customer will then be informed that the EV has been located or that the search for the vehicle has failed. The customer will also be informed when the charging has begun and the charging progress (amount charged and time to finish the requested amount of charging).

The customer can also provide the time at which the EV will be available for charging and the duration of time that the EV is going to be available for charging. The App can provide the feature of informing the CE that the customer is coming back or has come back to get the EV before the scheduled duration is over so that the SV can be dispatched to discontinue the charging and collect the CR. Thus, the customer is able to get "Mobile Charging Robot" (MCR) to stop charging and return to its station at any time (via the App or online or by calling the CE). The CR can be configured to recognize the EV being started or even moving while it is charging and issue an audible and/or visual warning or reduce its footprint in the direction of movement or the EV can be programmed to prohibit movement/operation while charging.

The EV with Wi-Fi connection can send the battery charging level to the CE so that CR with enough stored electrical energy is sent to the EV considering the charging order by the customer. The CR can communicate the charging level to the SV and CE such that it can be monitored in real time on the APP by the customer.

Instead of a charging time (duration), the customer may request a certain amount of electrical energy charging or a certain amount of miles to be driven (day or night) based on average expected range per charge amount or may ask for a maximum amount of charging time (all subject to full charge limits).

A scheduler can be provided for the SV to deliver CRs to EVs, given the EVs availability period, amount of charging requested, locations, etc., to minimize total time and idle times for the SV and the RCs.

The CE can collect charging requests and operational data over time and use AI to plan logistics of where to place charging assets (SVs, CRs, CR charging capabilities, MCRs, etc.).

After a successful charging service, the customer's account is debited, credit card charged, EZ or Sun-Pass charged etc.

Furthermore, in colder climates the EV batteries can first be internally heated using one or more of the methods/devices disclosed in U.S. Pat. Nos. 10,063,076; and 10,855,085 and/or U.S. Patent Application Publication Nos. 2020/0176998; 2020/0176835; 2020/0176999; 2020/0389033 and/or U.S. application Ser. Nos. 17/200,844 and 17/200,846 and/or U.S. Provisional Application No. 63/078,251, the contents of each of which are incorporated herein by reference. Such methods/devices can significantly reduce the time required to fully charge the EV batteries or provide more charge within a predetermined time period.

Although described with regard to the CR having a charging battery, the CR may have other sources of electrical energy for charging, such as a fuel cell, solar cell and an internal combustion generator.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A service vehicle for charging a parked electric vehicle, the service vehicle comprising:
    a platform supported by two or more wheels;
    one or more charging robots disposed on the service vehicle, the one or more charging robots being configured to supply electrical energy to the parked electric vehicle to charge one or more batteries of the electric vehicle;
    wherein the one or more charging robots are configured to have a first shape for storage on the service vehicle and to have a second shape when deployed from the service vehicle, the one or charging robots being unattached to the service vehicle and operated independently of the service vehicle when in the second shape, the second shape being configured to charge the one or more batteries of the electric vehicle, and the second shape being different from the first shape.

2. The service vehicle of claim 1, wherein the service vehicle is manually operated.

3. The service vehicle of claim 1, wherein the service vehicle is driverless.

4. The service vehicle of claim 1, wherein the one or more charging robots comprises a plurality of charging robots.

5. The service vehicle of claim 1, wherein at least one of the two or more wheels of the service vehicle are electrically powered.

6. The service vehicle of claim 1, wherein the service vehicle having a mechanism for deploying the one or more charging robots from the service vehicle.

7. The service vehicle of claim 1, wherein the service vehicle having a ramp for deploying the one or more charging robots from the service vehicle.

8. The service vehicle of claim 7, wherein the one or more charging robots having one or more powered wheels for driving off of the service vehicle via the ramp.

9. The service vehicle of claim 1, wherein in the second shape, the one or more charging robots being configured to at least partially deploy under the electric vehicle.

\* \* \* \* \*